United States Patent Office 3,317,447
Patented May 2, 1967

3,317,447
ASPHALTENE TREATING PROCESS
Ernest P. Black, West Chester, and James B. Clelland, Newtown Square, Pa., and Seymour W. Ferris, deceased, late of Mount Holly, N.J., by Lucretia G. Ferris, executrix, Mount Holly, N.J., assignors to Sun Oil Company, Philadelphia, Pa., a corporation of New Jersey
No Drawing. Filed Aug. 25, 1965, Ser. No. 482,636
5 Claims. (Cl. 260—28.5)

This invention relates to a process of modifying asphaltenes. More particularly this invention relates to a process of improving the physical and chemical characteristics of asphaltenes by treatment of asphaltenes with sulfur and solid alpha olefin polymers and to the novel products derived therefrom.

This application is a continuation-in-part of our copending application Ser. No. 187,919, filed Apr. 16, 1962 and now abandoned.

The use of petroleum residuum such as asphalt as a paving material or as a protective coating material is well known. It is also well known that certain physical properties of asphalt can be enhanced by treatments such as air blowing or heating in the presence of sulfur or chlorine. However, even with all of the above treatments, asphalt remains as an inferior composition for many applications.

More recently it has been disclosed that blends of certain polymers and asphalt provide improved paving and coating compositions. However, the large differences in physical properties of asphalt and many of these polymers, particularly melting range, results in compositions which are still lacking in certain desired chemical and physical properties.

It has now been discovered that many of the inherent deficiences of previously known petroleum residuum-derived paving and coating compositions can be overcome.

It has been discovered that a particular fraction of petroleum residuum, that is asphaltenes, when substantially separated from asphalt and mixed with a solid alpha olefin polymer and heated within a prescribed temperature range in the precence of 1 to 30 weight percent elemental sulfur based on the weight of the mixture, results in a modified asphaltene composition having improved chemical and physical properties.

The improvements realized in the physical properties are especially recognized in the form of a higher temperature melting range, improved resistance to solvents, and higher resistance to rupture as measured by modulus of rupture. The improved chemical properties of the compositions of the present invention are particularly evident in the improved resistance to solvents such as carbon disulfide and carbon tetrachloride. These and other improvements realized in the compositions of the present invention will be more fully realized in the disclosure which follows.

Asphalts are colloidal systems having a disperse phase and a continuous phase. The disperse phase, i.e., the micelles, comprises the components of highest molecular weight—known to the art as asphaltenes. They are solids. The continuous, or intermicellar phase, represents the components of lower molecular weight; and these are known as maltenes. They are non-solids. The maltenes are further divided for purposes of classification into a resin fraction and an oil fraction.

Asphaltenes are organic materials and are defined by their solubility characteristics in certain arbitrarily selected solvents. The asphaltenes are insoluble in low-boiling saturated hydrocarbons such as petroleum naphtha, pentane and hexane, but are soluble in carbon tetrachloride and carbon disulfide. These solubility characteristics are the basis of the separation of asphaltenes as a distinct phase. They are usually separated from the solvent in the form of a coarse brown-black powder having essentially no cohesiveness. The yield and properties of an asphaltene depend upon the asphalt source, the kind and amount of solvent used for separation, and the separation conditions. Asphaltenes have a high carbon-to-hydrogen atomic ratio and contain varying amounts of oxygen, sulfur, and nitrogen. A high carbon-to-hydrogen ratio indicates a strongly aromatic nature, benzene having a ratio of about 1.0 and naphthalene about 1.25. Asphaltenes have a C:H ratio of from about 0.70 to about 1.25 depending on the source of the original asphalt.

Asphaltenes are believed to have a molecular weight of from about 2000 to about 10,000. The actual molecular configuration of asphaltenes is not known. Some observers suggest a configuration involving large fused rings and others suggest smaller fused rings joined by and bearing aliphatic chains.

The source of the starting asphaltenes treated is not critical. Any bitumen, asphalt or crude residuum containing asphaltenes is suitable. The two principal sources are native asphalts and asphalts resulting from petroleum refining operations. The source material will often have to be treated to separate and concentrate the asphaltenes. This can be done with solvents such as petroleum naphtha, propane, pentane, hexane, cyclohexane, and diethylether, or any other means known in the art. It is not necessary that the asphaltene concentration of the starting material be 100%. However, a concentration of at least 50 wt. percent asphaltenes in the asphaltene concentrate is required to obtain products with the desired properties. The preferred concentration of asphaltenes is 75 to 100 wt. percent. The starting material will often contain small amounts of sulfur, nitrogen, oxygen, vanadium, nickel, and iron. It can have a melting point ranging from about 300 to about 500° F. and it will be 95–99% soluble in $CS_2$. These properties depend on the conditions of the method of concentration, e.g., solvent, severity, number to treating stages, etc.

It is believed that the sulfur component in the treated mixture promotes chemical bonding between the asphaltene molecules and the alpha olefin polymer chains. The lack of any significant increase in the sulfur content of the recovered modified asphaltenes is rather conclusive in indicating that the present process is by no means a method of sulfurizing asphaltenes. This chemical reaction appears to be unique and unobvious since it is well known that alpha olefin polymers do not normally react with sulfur particularly in vulcanization processes.

The subject reaction involves modification of the asphaltene molecules as evidenced by the evolution of $H_2S$, the solvent properties and the high melt point of the resultant products. Alpha olefin polymers are employed as modifying materials and the polymers become chemically joined with the asphaltenes as evidenced by the properties of the altered products.

Polymers which are particularly suitable as modifying materials for use with sulfur and asphaltenes are the polypropylenes. Propylene can be polymerized to high molecular weight polymers by the procedures and catalysts disclosed in United States Patent Nos. 2,824,446; 2,996,491; 2,996,493; 3,055,878; 3,061,601; 3,099,647; and Belgian Patent Nos. 533,362; 534,792; and 534,888, and others. The molecular weights of the polymers can vary from 1000 to 500,000 or higher, depending on the properties desired in the final product. The polymer products produced by the methods disclosed in the above patent references are normally recovered as two fractions. The first fraction, which is often referred to as isotactic polymer, is usually the high molecular weight polymer which is insoluble in the polymerization medium. This isotactic polymer can be from 30 to 100% crystalline according to the many known procedures of determining polymer crystallinity, e.g., X-ray analysis. The second fraction of the polymer product is normally low molecular weight amorphous polymer which is soluble in the polymerization medium. This polymer fraction is often referred to as atactic polymer. Both fractions are effective for the purposes of this invention. The atactic polypropylene used in the examples given hereinafter was synthesized by a low pressure polymerization procedure such as those disclosed in the patent references above and is characterized as melting in the range of 250°–350° F. and as having a specific gravity of 0.86 and a molecular weight range of 10,000 to 30,000. The isotactic polypropylene used in the examples given hereinafter was synthesized by a low pressure polymerization procedure as disclosed in the patent references above and is characterized as melting in the range of 300°–350° F. and as having a molecular weight ranging from 50,000 to 200,000 or more. The polymers are thermoplastic.

The mixture of asphaltenes and alpha olefin polymer which is admixed with sulfur and heated can be in the ratio range of 1 part by weight of asphaltenes to 20 parts by weight of polyolefin up to 20 parts by weight of asphaltenes to 1 part by weight of polyolefin. The ratio of asphaltenes to polyolefin in the mixture to be treated is predetermined by which characteristics are desired in the modified asphaltene product. For example if a high melting point product is desired, asphaltenes will comprise the major portion of the mixture. If a high modulus of rupture is desired in the product, the polyolefin component will form the major portion of the mixture to be treated. The preferred mixture which produces a modified asphaltene with the most attractive physical proprties is 25 to 75 parts by weight of polyolefin per 100 parts by weight of asphaltene-polyolefin-sulfur mixture.

The object of this invention is to provide a method of altering asphaltene molecules with sulfur and thermoplastic polymers to provide new material having a relatively high melting point and improved resistance to solvents as well as an improvement in the rigid strength properties as measured by the modulus of rupture procedure given hereinbelow. Another object of the invention is to provide compositions comprising asphaltenes and modifying materials which provide products that have a wide range of desirable properties depending on the type of polymeric modifying material employed. Still another object of the invention is to provide molded articles and coating compositions having good strength and/or flexibility for use in high temperature service.

In carrying out the invention the asphaltene, polyolefin modifying material, and sulfur are placed in any suitable vessel and heated for the desired length of time. The treating is usually conducted at temperatures ranging from 300° to 1000° F., the preferred range being 450° to 650° F. Pressures ranging from subatmospheric to 100 p.s.i. or more can be used, with good results being obtained at atmospheric pressure. Treating times ranging from 10 minutes to 48 hours can be used. Ordinarily times of 30 to 90 minutes at treating temperatures ranging from 450° to 650° F. are preferred. Heating is usually accomplished in an inert atmosphere such as nitrogen but it can be accomplished in air.

The modified asphaltenes recovered as products from the above described process are characterized as melting within the range of 275° to 600° F. and having a maximum solubility in carbon disulfide of 70 weight percent at room temperature. The modulus of rupture of modified asphaltenes is normally within the range of 200 to 5000 p.s.i., preferably above 1000 p.s.i. as measured by the herein disclosed procedures. The solubility of modified asphaltenes is normally less than 50 weight percent in carbon tetrachloride at room temperature.

Asphaltenes were prepared from a vacuum reduced petroleum residuum asphalt having the following properties:

| | |
|---|---|
| Viscosity-Salbolt Furol @ 210° F. | 1191 |
| Specific gravity @ 77° F. | 1.019 |
| Softening point, ° F. | 111 |
| Penetration: | |
| @ 32° F. (ASTM D–5–25) | 25 |
| @ 39.2° F. | 33 |
| @ 77° F. | 103 |
| Flash (open cup), ° F. | 655 |
| Solubility in 86° naphtha (AASHO–T–4635) | 78.3 |
| Naphtha asphaltenes, percent | 21.7 |

For the purpose of these examples solubility in naphtha will be considered the measure of asphaltenes, i.e., the portion which is insoluble in the solvent is asphaltenes.

6.85 gal. (35#) of the above asphalt were heated to about 180° F. and extracted with 30.3 gal. of 86° naphtha. The solution was allowed to settle, and the solvent layer was drawn off. The raffinate was extracted again with 34.3 gal. of solvent. After settling the solvent layer was drawn off. The wet product was air dried, then heated in a steam bath, and dried. The dry asphaltene yield was 6066 grams.

Two additional portions of the above asphalt were extracted in the same manner. The total dry asphaltenes amounting to 15,189 grams were ground and sieved to a fine powder. Ninety-six percent of the powder passed through an 8-mesh sieve. The asphaltenes were 13.1% soluble in 86° naphtha, 99.8% soluble in carbon disulfide and 98.7% soluble in carbon tetrachloride. Thus the naphtha asphaltenes were 86.9%. This material was used for the examples which follow.

For the purposes of the present invention sulfur can be used in elemental form such as flowers of sulfur, colloidal sulfur, lac sulfur, etc. From 1 to 30 wt. percent sulfur based on the weight of the total mixture can be used with amounts ranging from 5–25 wt. percent being preferred.

The polyolefin modifying material can be mixed together with the asphaltenes and sulfur in any suitable manner prior to treatment. Solvents and/or heat as well as mixing devices can be used to obtain a homogeneous mixture.

With reference to the table given herein Example 1 illustrates the properties of untreated, unmodified asphaltenes recovered from asphalt by the above-disclosed methods.

Example 2 illustrates the physical properties of modified asphaltenes and the processing conditions used in preparing those modified asphaltenes using atactic polypropylene as the polyolefin component of the treated mixture.

Examples 3 and 4 illustrate the physical properties of two different modified asphaltene products. These examples illustrate the processing conditions used in preparing those modified asphaltene products using isotactic polypropylene as the polyolefin component of the mixtures treated.

Example 5 presents for purposes of comparison the pertinent properties of atactic polypropylene.

Example 6 presents for purposes of comparison the pertinent properties of isotactic polypropylene.

The improvement in the solvent resistance properties of modified asphaltenes is illustrated in the table by the lower values shown for the naphtha, carbon tertachloride and carbon disulfide solubility of each of the modified asphaltenes of Examples 2, 3, and 4, particularly when they are compared with the solubility properties of unmodified asphaltenes as shown in Example 1. Asphaltenes are almost completely soluble in carbon disulfide as is shown in Example 1; however, after being modified according to the methods of the present invention, the solubility in carbon disulfide of asphaltenes as modified is greatly reduced as Examples 2, 3, and 4 illustrate. A comparison of these solubility characteristics of the asphaltene-polyolefin mixture before and after treatment clearly establishes that a chemical modification of the asphaltenes and polyolefins has taken place which modification is conceived to be a chemical bonding of the two components of the mixture which bonding is facilitated by heating in the presence of sulfur.

Also the improved modulus of rupture and improved melting points of Examples 2, 3 and 4 when compared to Example 1 are further evidence to support the conclusion of the chemical reaction of the novel process of the present invention which results in the new and unique compositions disclosed herein.

such as roofing, hardboard, particle board, laminates and insulating board can be made using the compositions of the invention. The compositions can also be used in pipe, pipe coating, road paving, and potting compounds. The composition can be foamed or used as foam components.

It is to be understood that the foregoing detailed description is given merely by way of illustration and many alternations may be made therein without departing from the spirit of the invention.

The invention claimed is:

1. A process for the preparation of modified asphaltenes which comprises heating at a temperature in the range of 300–1000° F. a mixture consisting essentially

TABLE.—MODIFIED ASPHALTENES

| Example No. | Asphaltenes, Percent | Polypropylene Modifying Agent, Percent | Percent Sulfur Added to Mixture | Treating Temp., °F. | Solubility, Percent | | | Wt. Percent S in Prod. | Melt Pt., °F. | Mod. of Rupture, p.s.i. |
|---|---|---|---|---|---|---|---|---|---|---|
| | | | | | Naphtha | CCl₄ | CS₂ | | | |
| 1 | 100 | | (¹) | | 13.1 | 98.7 | 99.8 | 4.4 | 330 | 180 |
| 2 | 63 | Atactic, 32 | 5 | 550 | 32.4 | 39.1 | 66.1 | 4.5 | 550 | 204 |
| 3 | 63 | Isotactic, 32 | 5 | 550 | 7.1 | 20.4 | 36.7 | 4.2 | 550 | 1,150 |
| 4 | 32 | Isotactic, 63 | 5 | 550 | 0.6 | 8.9 | 16.7 | 2.5 | 325 | 3,250 |
| 5 | 0 | Atactic | (¹) | | 49.0 | 52.4 | 55.6 | 0.02 | 300 | |
| 6 | 0 | Isotactic | (¹) | | 0.2 | 0.6 | 0.4 | 0.01 | 335 | |

¹ No treatment.

The hot plate melting point property as disclosed in the table was determined in the following manner. The sample of the treated asphaltene composition was placed on a steel slab which was heated on a hot plate gradually from room temperature until the sample melted. The increasing temperature and the melting point was determined by standard temperature determining devices.

The modulus of rupture property as disclosed in the table was determined in the following manner. A molded or cast strip of the sample of the treated asphaltene composition 1″ x 4″ x ⅛″, resting on parallel rods (¼″ diam.) placed 2 inches apart, was weighted at the midpoint between the rods by means of an inverted stirrup to which a pail was attached. The weight was gradually increased to the breaking point of the specimen by water flowing into the pail at a steady rate of 2.2 lbs./minute.

The sum of the weight of water in the pail at the breaking point plus the weights of the pail and stirrup were introduced into the following equation (Young's Modulus of Rupture) in calculating the modulus of rupture:

$$MR = \frac{3PL}{2BT^2}$$

where $P$ = weight in lbs.
$L$ = length between supports
$B$ = width of specimen
$T$ = thickness of specimen The tests were run with the specimen at room temperature, about 80° F.

Compositions prepared in accordance with the invention can be molded, extruded, or cast to form rods or plates or any other desired shapes. They can be extended with suitable fillers including asbestos, sand, clays, paper, wood flour, sawdust, glass fibers, asphalts, calcium carbonate, metallic fibers, etc. Construction materials of asphaltenes and polypropylene in the range of 1–20 to 20–1 parts by weight of polypropylene to asphaltenes in the mixture and 1–30 weight percent elemental sulfur based on the weight of the total mixture and recovering a reaction product having a melting point in the range of 275–600° F. and a maximum solubility in carbon disulfide of 70 weight percent.

2. A process according to claim 1 wherein the mixture is heated to a temperature in the range of 450–650° F.

3. A process according to claim 1 wherein the polypropylene is substantially isotactic polymer.

4. A process according to claim 1 wherein the polypropylene is substantially atactic polymer.

5. The product of the process of claim 1.

References Cited by the Examiner

UNITED STATES PATENTS

| | | | |
|---|---|---|---|
| 2,009,712 | 7/1935 | Frolich | 260—758 |
| 2,276,155 | 3/1942 | Carr | 208—23 |
| 2,447,004 | 8/1948 | Gamson | 260—139 |
| 2,909,498 | 10/1959 | Sayko | 260—28.5 |
| 3,010,927 | 11/1961 | Odasz et al. | 260—28.5 |
| 3,036,900 | 5/1962 | Honeycutt | 260—28.5 |
| 3,093,610 | 6/1963 | Wurstner et al. | 260—28.5 |
| 3,127,379 | 3/1964 | Natta et al. | 260—30.8 |
| 3,144,424 | 8/1964 | Clelland | 260—28.5 |
| 3,146,118 | 8/1964 | Thorpe | 208—44 |

OTHER REFERENCES

Abraham: "Asphalts and Allied Substances," vol. I, 5th Edition, Van Nostrand Co., New York, 1945, page 481.

MORRIS LIEBMAN, *Primary Examiner.*

B. A. AMERNICK, *Assistant Examiner.*